United States Patent
Kimchi et al.

(10) Patent No.: US 7,634,606 B2
(45) Date of Patent: Dec. 15, 2009

(54) MODULAR EXPANDABLE MOBILE NAVIGATION DEVICE

(75) Inventors: Gur Kimchi, Bellevue, WA (US);
Jeffrey D. Couckuyt, Bothell, WA (US);
Thomas A. Bailey, Kirkland, WA (US);
Rick D. Welsh, Duvall, WA (US)

(73) Assignee: Microsoft Corproation, Redmond, WA (US)

( * ) Notice: Subject to any disclaimer, the term of this patent is extended or adjusted under 35 U.S.C. 154(b) by 238 days.

(21) Appl. No.: 11/687,172

(22) Filed: Mar. 16, 2007

(65) Prior Publication Data

US 2008/0228982 A1    Sep. 18, 2008

(51) Int. Cl.
*G06F 13/00* (2006.01)
*G05B 19/18* (2006.01)

(52) U.S. Cl. .................... 710/303; 710/304; 700/66
(58) Field of Classification Search ............... 710/303, 710/304; 700/66
See application file for complete search history.

(56) References Cited

U.S. PATENT DOCUMENTS

| | | | |
|---|---|---|---|
| 4,020,527 A | 5/1977 | O'Neill | |
| 5,479,001 A | 12/1995 | Kumar | |
| 5,786,789 A * | 7/1998 | Janky | 342/357.1 |
| 5,867,773 A * | 2/1999 | Mareno et al. | 455/575.9 |
| 6,028,765 A | 2/2000 | Swindler et al. | |
| 6,341,693 B2 * | 1/2002 | Konno et al. | 206/449 |
| 6,421,234 B1 | 7/2002 | Ricks et al. | |
| 6,480,149 B1 * | 11/2002 | Sutherland et al. | 342/357.1 |
| 6,798,647 B2 * | 9/2004 | Dickie | 361/683 |
| 6,810,323 B1 * | 10/2004 | Bullock et al. | 701/206 |

(Continued)

FOREIGN PATENT DOCUMENTS

EP        854584 A2 *   7/1998

(Continued)

OTHER PUBLICATIONS

Pham et al., "Handheld Devices for Applications Using Dynamic Multimedia Data", Jun. 2004, ACM, Proceedings of the 2nd International Conference on Computer Graphics and Interactive Techniques in Australasia and South East Asia, pp. 123-130.*

(Continued)

*Primary Examiner*—Mark Rinehart
*Assistant Examiner*—Faisal M Zaman
(74) *Attorney, Agent, or Firm*—Shook, Hardy & Bacon L.L.P.

(57) ABSTRACT

An expandable system for mobile navigation facilitates a modular implementation of structural units to add desired functionality to a base navigation device. The system is embodied as a handheld mobile navigation device in one arrangement, including a base unit housing containing circuitry for determining a geographic location of the navigation device and a module unit housing containing circuitry for delivering additional functional activity. In particular, the base unit housing includes a primary interface for interconnecting with a secondary interface of the module unit housing, to enable signals generated or handled by a circuitry component of the module unit to be relayed to the circuitry of the base unit housing. Additionally, the module unit housing is configured to be releasably attached directly with the base unit housing upon the primary interface and secondary interface interconnecting with one another, to form the mobile navigation device as a physically connected package.

11 Claims, 6 Drawing Sheets

U.S. PATENT DOCUMENTS

| | | | |
|---|---|---|---|
| 6,937,464 | B2 | 8/2005 | Adams et al. |
| 6,988,910 | B2 | 1/2006 | Gartrell |
| 6,996,424 | B2 | 2/2006 | Ijas et al. |
| 7,017,243 | B2 * | 3/2006 | Carnevali ................... 24/523 |
| 7,092,695 | B1 * | 8/2006 | Boling et al. ............ 455/404.1 |
| 7,147,163 | B2 | 12/2006 | Salvato et al. |
| 2005/0064905 | A1 * | 3/2005 | Pinder ........................ 455/557 |
| 2005/0079898 | A1 * | 4/2005 | Park ........................ 455/575.1 |
| 2006/0190652 | A1 | 8/2006 | Keely et al. |
| 2006/0217129 | A1 | 9/2006 | Katsumata et al. |

FOREIGN PATENT DOCUMENTS

| | | | |
|---|---|---|---|
| EP | 1508814 A2 * | 2/2005 | |
| WO | WO 9521386 A1 * | 8/1995 | |
| WO | WO 2007084316 A2 * | 7/2007 | |

OTHER PUBLICATIONS

Frank, G.B.; Yakos, M.D., "Collins Next Generation Digital GPS Receiver," Position Location and Navigation Symposium, 1990. Record. The 1990's—A Decade of Excellence in the Navigation Sciences. IEEE Plans '90., IEEE, vol., No., pp. 286-292, Mar. 20-23, 1990.*

Guth, P.L.; Oertel, O.; Benard, G.; Thibaud, R., "Pocket Panorama: 3D GIS on a handheld device," Web Information Systems Engineering Workshops, 2003. Proceedings. Fourth International Conference on , vol., No., pp. 100-105, Dec. 13, 2003.*

Graham Thompson, "A Friend in the Back of Beyond :The latest handheld GPS receivers can display top-quality maps, so ramblers need never get lost again. Graham Thompson tests five, and their most detailed mapping Test Bench Handheld GPS", Jul. 12, 2009, Sunday Times, London, UK, p. 18.*

Oliver Stefani, et al., "Design of Interaction Devices for Optical Tracking in Immersive Environments", 5 pgs., http://www.ve.iao.fhg.de/papers/HCI_Paper_Optical_Input_Devices.pdf.

Roy Want, et al., "An Overview of the ParcTab Ubiquitous Computing Experiment", 31 pgs., http://www.cs.bilkent.edu.tr/~korpe/courses/cs515-fall2002/papers/parctab-overview.pdf.

* cited by examiner

MODULAR EXPANDABLE MOBILE NAVIGATION DEVICE

BACKGROUND

Electronic navigation devices have become mainstream consumer items in modern times. Such navigation devices are used to both determine a current location in relation to the earth and to calculate a route for getting from one location to another referenced location. The determination of the current location of the navigation device is typically determined by radiolocation or satellite location techniques. With radiolocation, one common procedure is to measure either the angle or time difference of arrival of radio signals from stationary towers or base stations received by the navigation device. Based on these measurements, the position of the navigation device relative to the stationary towers can be determined, as well as the position of the navigation device within a reference coordinate system on the earth if a geo-referenced location for the towers is known. Satellite location techniques, on the other hand, currently utilize the global positioning system (GPS) satellites to determine a distance between the navigation device and three or more satellites. This is accomplished by measuring the time delay between transmission and reception of each GPS radio signal that is received by the navigation device. Because the speed of travel of the GPS radio signal is known, and the signal includes location information for the respective satellite, the navigation device can determine a current position for itself within a reference coordinate system on the earth.

Technological advances in hardware design have enabled navigation devices to be formed as handheld-type portable devices. In particular, reductions in the form factor of microprocessors, GPS receivers, and other circuitry have made it possible to design a compact navigation device. Nevertheless, depending on the desired functionality for a given device, the hardware or other electronics necessary to support such functions may require a relatively large housing structure for a handheld-type portable device. Challenges, therefore, can exist in designing navigation devices that achieve a proper balance between a desired level of portability and the functionality required for a device to provide a robust set of features.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The systems and methods embodied herein enable portable navigation and additional functional activity via a compact, expandable package. In particular, an expandable form of the systems facilitates a modular implementation of structural units which house certain functional components. This arrangement allows a base form of the expandable package to perform a certain preestablished set of functions, with certain modules added to the package to enable additional functions.

BRIEF DESCRIPTION OF THE DRAWINGS

The present invention is described in detail below with reference to the attached drawing figures, wherein.

DETAILED DESCRIPTION

Figure 1:
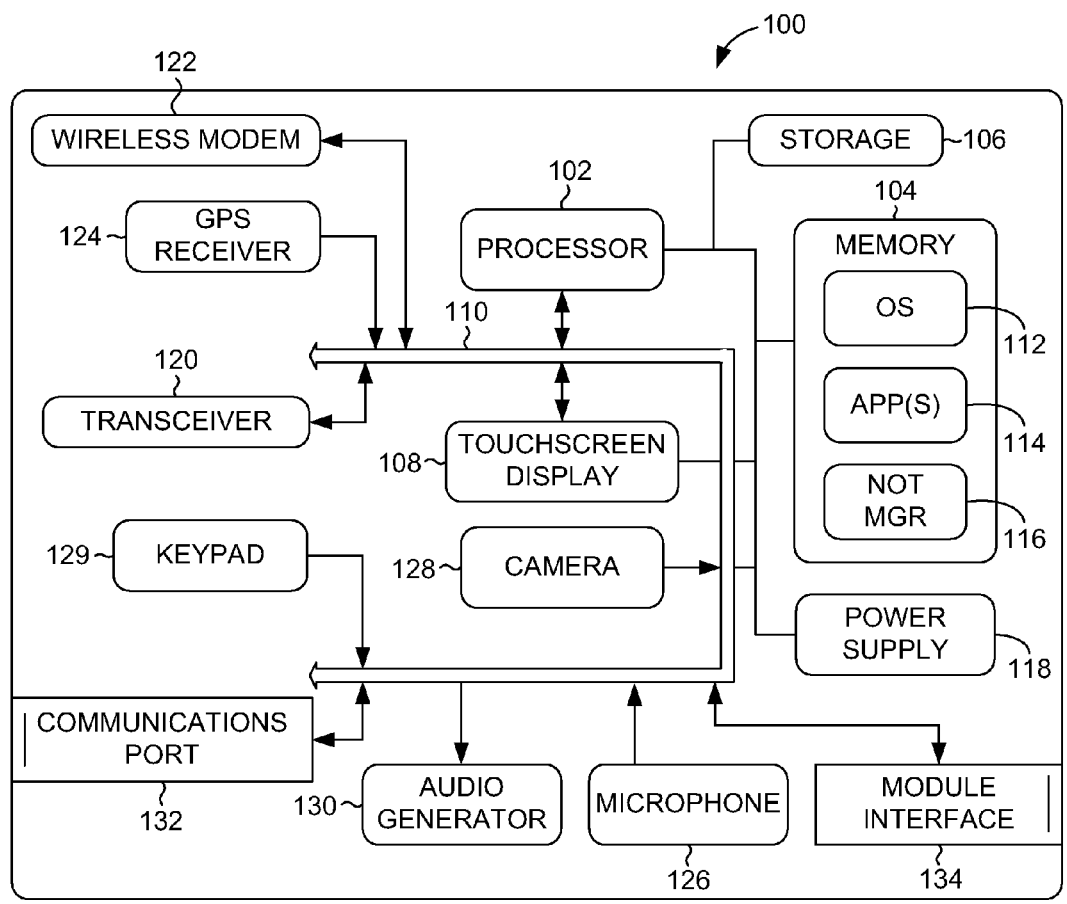
FIG. 1 is a schematic view of one embodiment of a set of functional components of a base processing and display unit of an expandable mobile navigation device.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Embodiments of an expandable system for mobile navigation of the present invention are shown throughout the drawing figures. In embodiments, the system utilizes modular structural units for adding certain functional components to a navigation device. Depending on the functional components implemented, the system may allow a user to connect to the Internet or other network, to perform image capturing activities, to read a media card, or perform other activities. It should be understood that this list of activities is merely an example of what may be accomplished through selection of particular types of modular units, as explained in further detail herein.

According to one aspect, a handheld mobile navigation device includes a base unit housing containing circuitry for determining a geographic location of the navigation device and a module unit housing containing circuitry for delivering additional functional activity. The base unit housing includes a bus, as well as a processing component which determines the geographic location, a display screen for presenting information related to the determined geographic location, a power supply, a receiver, and a primary interface, each of which is coupled with the bus. The receiver captures signals utilized by the processing component in making the geographic location determination. A secondary interface of the module unit housing is designed to mate with the primary interface of the base unit housing, enabling signals generated or handled by a circuitry component of the module unit to be relayed to the circuitry of the base unit housing. Additionally, the module unit housing is configured to be releasably attached directly with the base unit housing upon the primary interface and secondary interface interconnecting with one another, to form the mobile navigation device as a physically connected package.

In another aspect, a handheld expandable system for mobile navigation includes a base processing and display unit, or base unit, as well as one or more modular units releasably attachable with the base unit to present a monolithic body. The base unit contains a processing component for determining a geographic location of the system and a display screen for presenting information regarding the geographic location, both coupled with a bus. Additionally, the base unit includes a power supply, a receiver capturing signals utilized by the processing component in making the geographic location determination, and one or more primary interfaces, each of which is coupled with the bus. Each module unit includes a secondary interface designed to mate with one of the primary interfaces of the base unit, as well as a circuitry component for delivering additional functional activity. Through the connection between the secondary interface of one module unit and one of the primary interfaces of the base unit, signals generated or handled by the circuitry component of the respective module unit are relayed to the circuitry of the base unit.

According to another aspect, a user of the handheld expandable system for mobile navigation may perform certain navigation activities with the base unit alone, and then releasably attach one or more module units with the base unit. For instance, the circuitry component of each module unit may enable the expandable system to connect to the Internet or other network, to perform image capturing activities, to read a media card, or perform other activities, in addition to or complementary with activities performed by the base unit.

Turning now to FIG. 1, one suitable arrangement for a set of functional components of a base processing and display unit, or base unit 100, is illustrated. It is contemplated that other functional components not shown may be included in the base unit 100 dependent on the operational aspects of and features provided by the base unit 100. Additionally, less than all of the functional components may be needed in the base unit 100 if certain functionalities are not desired. It is to be understood that the functional component selection should take into account the overall compact and handheld nature of the base unit 100, as a integral part of the overall expandable system for mobile navigation.

As a computing device, the base unit 100 includes a processor 102 (e.g., a microprocessor) and memory 104. Depending on the exact configuration of the base unit 100, memory 104 may be volatile (such as RAM), non-volatile (such as ROM, flash memory, etc.) or some combination of the two. The base unit 100 may also have removable or non-removable storage, represented as storage 106. Computer storage media includes volatile and non-volatile, removable and non-removable media implemented in any method or technology for storage of information such as computer readable instructions, data structures, program modules or other data. Memory 104 and storage 106 are all examples of computer storage media. Computer storage media includes, but is not limited to, RAM, ROM, EEPROM, flash memory (such as on a PCMCIA card, a secure digital (SD) card, etc.) or other memory technology, optical storage, or any other medium which can be used to store the desired information and which can be accessed by the base unit 100. Any such computer storage media may be part of the base unit. It should be appreciated that the particular type of storage 106 selected is preferably compatible with the compact and hand-held form factor of the base unit 100.

The base unit 100 also includes a touchscreen display 108, certain input/output devices, and a bus 110 to electrically couple the functional components of the base unit 100 with the processor 102, memory 104 and storage 106. An operating system 112 is resident in memory 104 and executes on processor 102. For instance, operating system 112 may be a version of the Windows® XP operating system from Microsoft Corporation or other operating system. One or more application programs 114 are loaded into the memory 104 and run on operating system 112. Examples of applications include email programs, navigation or geo-location programs, Internet browser programs, scheduling programs, PIM (personal information management) programs, word processing programs, spreadsheet programs, and so forth. A notification manager 116 is loaded into memory 104, an executes on processor 102. Notification manager 116 handles notification requests from the applications 114. The base unit 100 also has a power supply 118 which may be implemented as one or more internal batteries or as a portable external power source, such as an external battery.

Input and output for the base unit 100 is made through various components. A transceiver 120 (acting as a receiver), a wireless modem 122, a GPS receiver 124, a microphone 126 (for voice communications over a network, speech-to-text activities or spoken command activities) a digital camera 128, and a keypad 129, as well as storage 106 (such as in the case of a memory card, e.g., an SD card) and touchscreen display 108, are configured to receive user input. For instance, touchscreen display 108 presents a set of menu options for a user to select by touching the display 108, in order control the activities of the base unit 100. Alternatively, the display 108 may be configured without input capability, such as with a standard LCD display or similar display component, where the input functionality of a touchscreen is instead received primarily through the keypad 129 or similar keyboard-type device. The digital camera 128 accomplishes image capture through a traditional sensor device, such as CCD or CMOS circuitry. Output is generated or otherwise handled by an audio generator 130 (e.g., a speaker and associated circuitry), as well as the storage 106, touchscreen display 108, the transceiver 118 (acting as a transmitter) and the wireless modem 120.

Additionally, a communications port 132 is provided for interconnecting with other electronic devices via a connection cable or the like, and a module interface 134, in the form of a primary connector, enables a module unit 200 to be coupled with the functional components of the base unit 100, as explained herein with reference to FIGS. 2-6. One example of a type of port that constitutes communications port 132 is a universal serial bus (USB) format port for a wired connection. Another example is an S-video or composite format port for sending audio and video signals through the communications port 132. Communications port 132 may also be formed to communication through wireless media, such as by radio frequency, infrared, or other wireless media. The module interface 134 presents conductors in a format for a wired connection (such as by USB format). It should be understood, however, that either or both of the communications port 132 and the module interface 134, serving as a primary connector, may be configured to facilitate the communication of signals in any format that provides a necessary number of channels according to a given communications protocol.

In one embodiment, the transceiver 120 (along with the microphone 126 and audio generator 130) allows the base unit 100 to perform communications activities across a telecommunications network. For instance, in combination with the microphone 126 and audio generator 130, the transceiver enables voice signals to travel across the network, such as in two-way cellular phone communication. Additionally, data communication across the network may also be handled by the transceiver 120. The transceiver 120, in another embodiment, also functions to receive radio signals from transmission towers that are processed by the processor 102 to determine a location of the base unit 100 by radiolocation techniques. The wireless modem 122 enables connection to a network by the base unit 100, such as to a local area network (LAN) or a wide area network (WAN), one example of which is the Internet. For instance, though the wireless modem 122 and based on a location of the base unit 100 uploaded to a network location (e.g., a control server and a database), information such as maps, aerial photographs, and other information can be downloaded to the base unit 100 that are referenced to the current location. The GPS receiver 124 also provides a geo-referenced location of the base unit 100 by receiving radio signals from three or more GPS satellites and passing such signals to processor 102 for processing according to a clock timer and information embodied in such signals pertaining to the current location of such GPS satellites.

Figure 2:
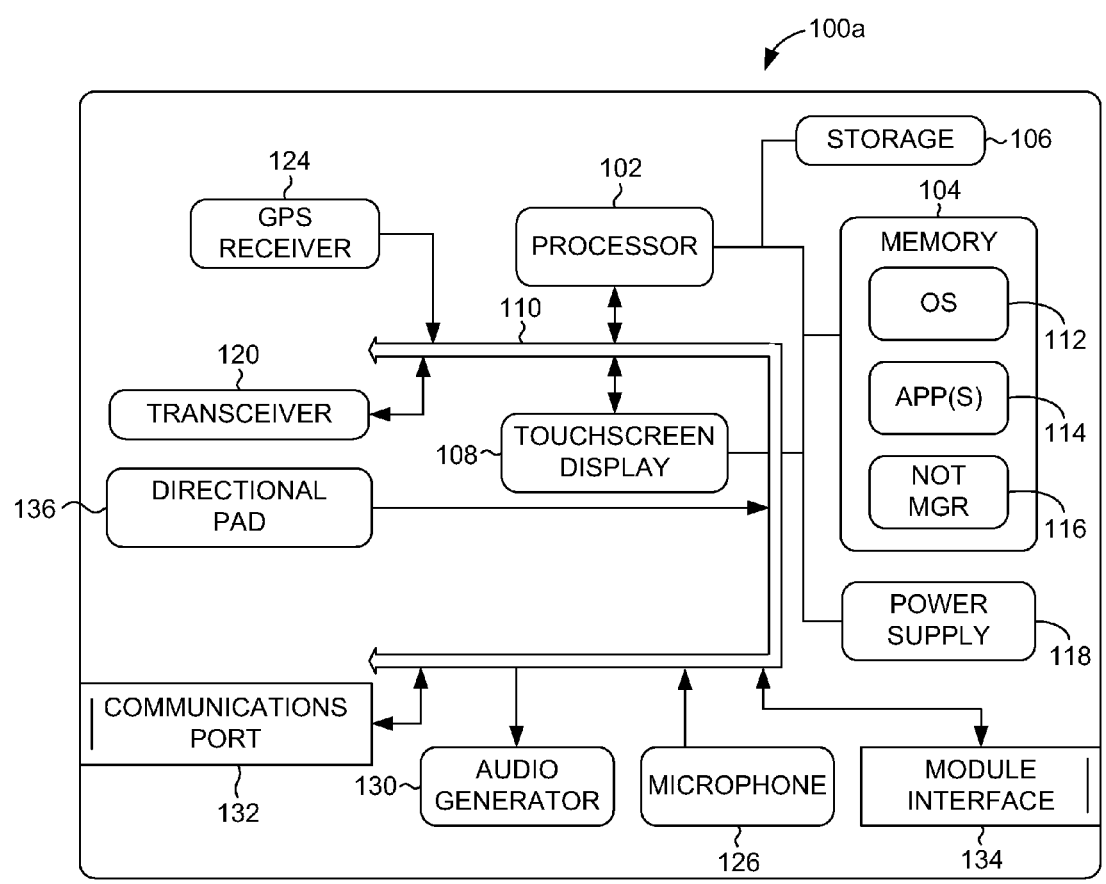
FIG. 2 a schematic view of another embodiment of a set of functional components of the base processing and display unit.

As an alternative to the particular arrangement of functional components depicted in FIG. 1, another base unit embodiment 100a is illustrated in FIG. 2. Except where differences are explicitly recited, the base unit 100a of FIG. 2 possesses the same functional components as the embodiment of the base unit 100 illustrated in FIG. 1. It should be understood, however, that alternative configurations of functional components may also be selected for the base unit 100a, as a matter of design choice.

The base unit 100a of FIG. 2 includes the processor 102, memory 104, storage 106, touchscreen display 108, bus 110, and certain input/output devices, similar to base unit 100 of FIG. 1. In particular, base unit 100a omits wireless modem 122 and digital camera 128, and substitutes a directional pad 136 or other digital input device. By depressing a certain portion of the directional pad 136, the user indicates a direction of movement. For instance, the direction of movement can move a visual indicator across the display 108 in a certain direction. Additionally, or in the alternative, the direction indicated by the user interaction with the direction pad 136 causes scrolling through menu options presented on display 108, the selection of which controls the activities of base unit 100a. A center portion of the directional pad 136 serves as a "selector" to select items presented on display 108 proximate to the visual indicator, or to select a menu item highlighted or otherwise presented as the current option. It can be appreciated that input provided through a directional pad 136 may eliminate the need of display 108 to function as touchscreen for receiving input. Thus, the display 108, in one arrangement, is merely a screen display without touchscreen functionality.

Figure 3A:
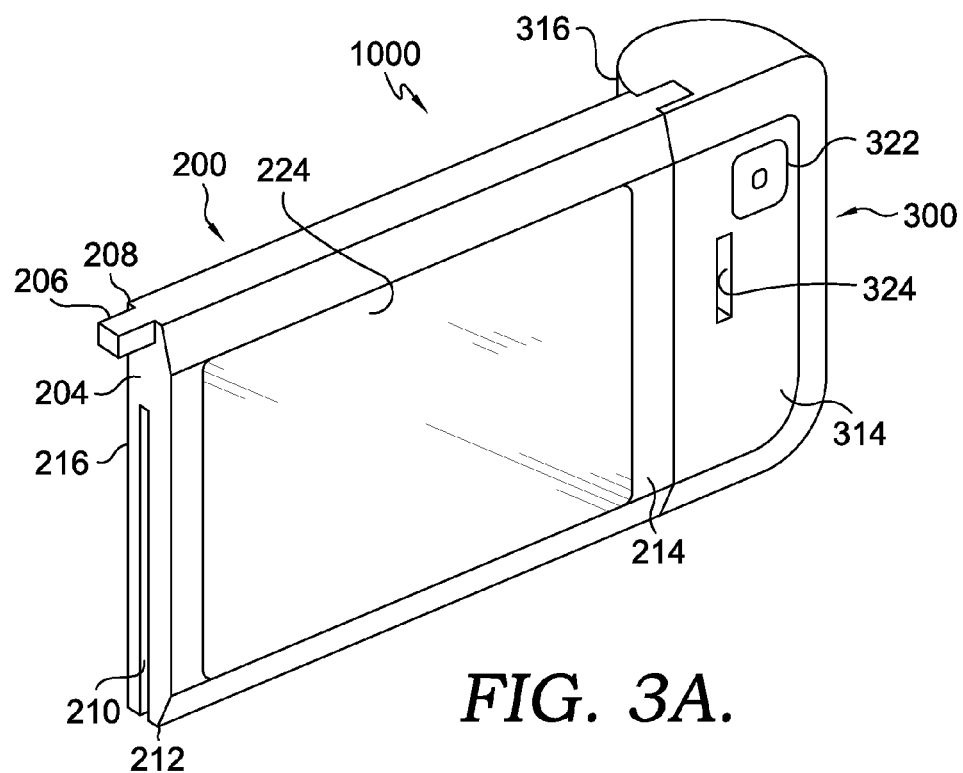
FIG. 3A-3D show various views of the expandable mobile navigation device, with FIG. 3A presenting a perspective view of a module unit connected with the base processing and display unit, FIG. 3B presenting a front elevational view similar to FIG. 3A, FIG. 3C presenting an exploded perspective view illustrating how the module unit connects with the base processing and display unit, and FIG. 3D presenting a perspective view of a pair of module units connected with the base processing and display unit.
Figure 3B:
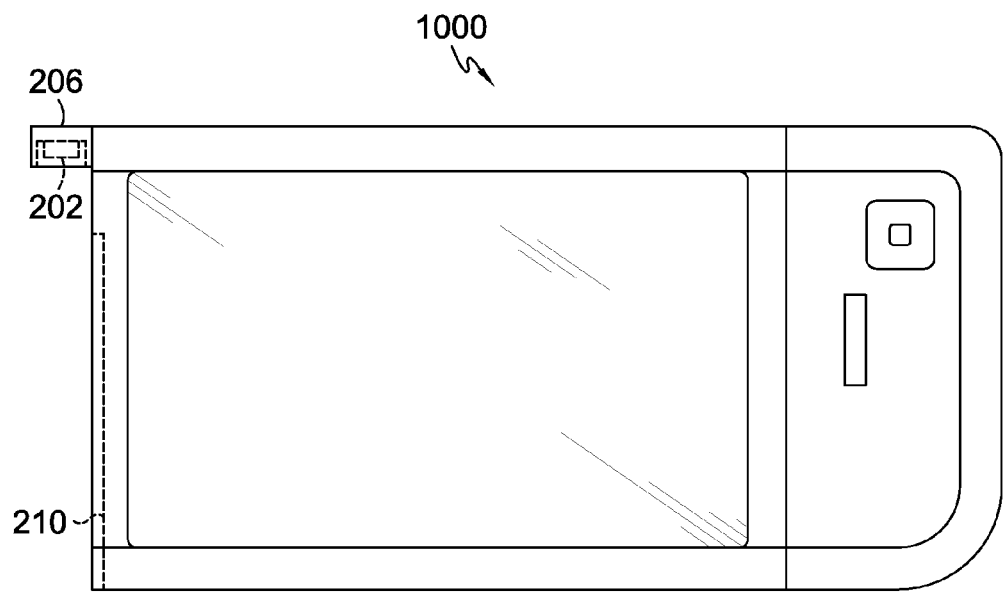
Figure 3C:
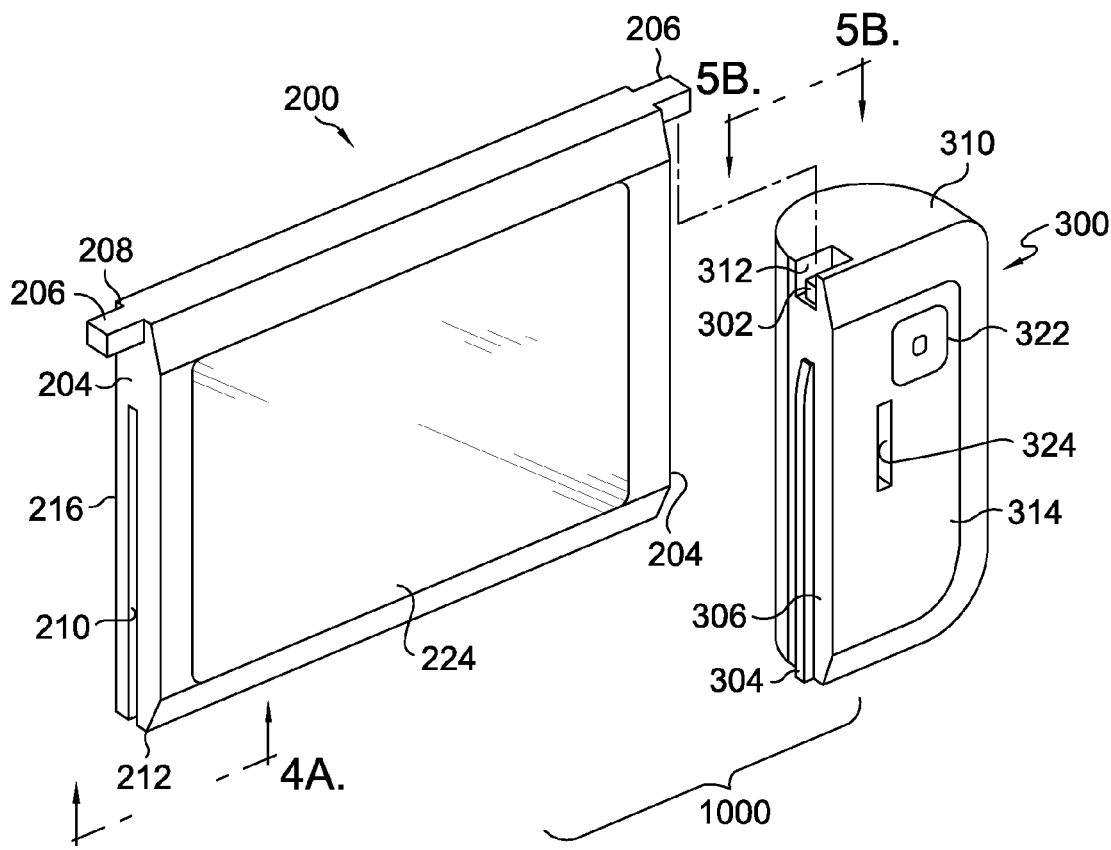
Figure 3D:
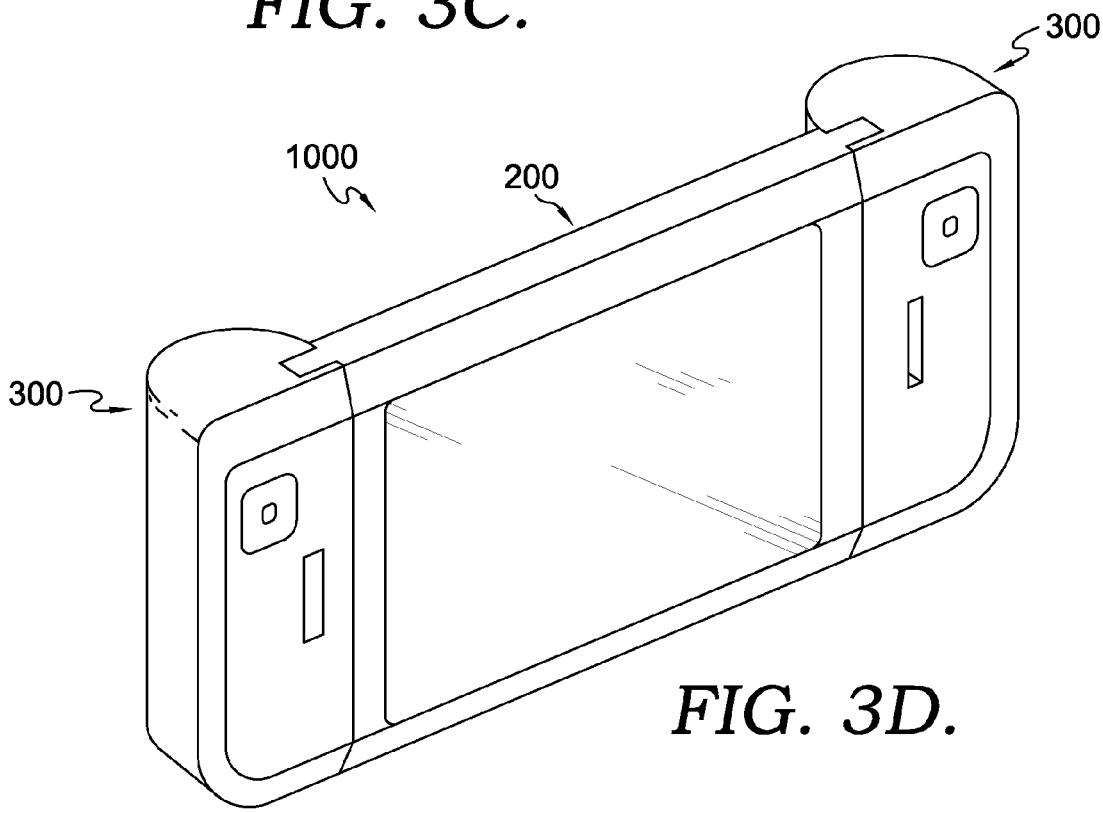
Figure 5A:
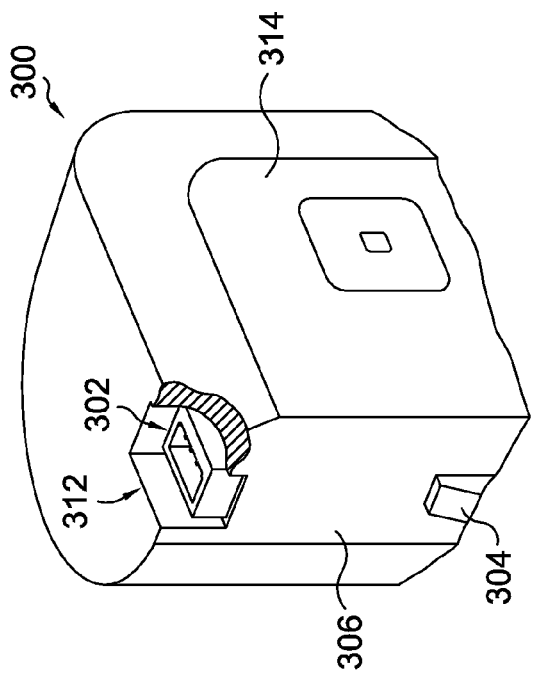
FIGS. 5A and 5B show various enlarged fragmentary views of the module unit, with FIG. 5A presenting a perspective view showing details of a secondary connector and FIG. 5B presenting a top plan view showing details of the secondary connector.
Figure 5B:
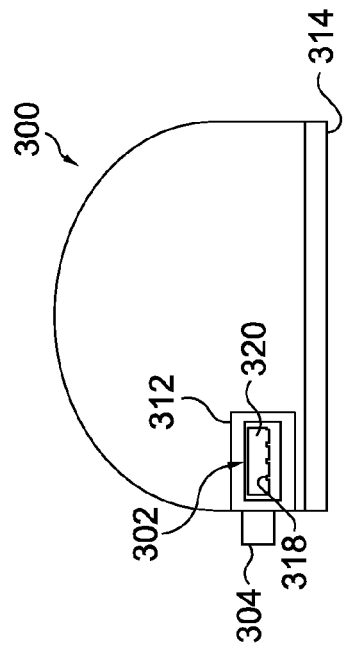
Figure 4A:
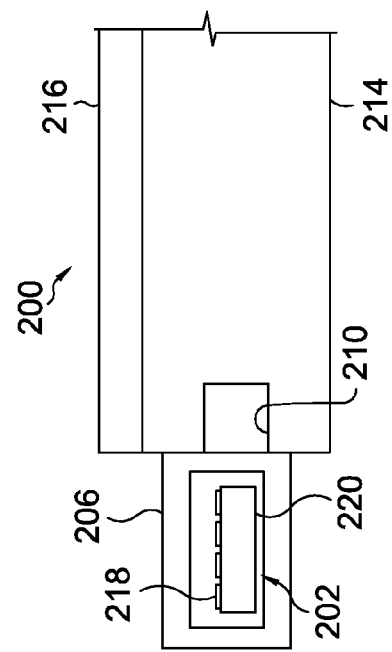
FIGS. 4A and 4B show various enlarged fragmentary views of the base processing and display unit, with FIG. 4A presenting a bottom plan view showing details of a primary connector and FIG. 4B presenting a bottom perspective view showing details of the primary connector.
Figure 4B:
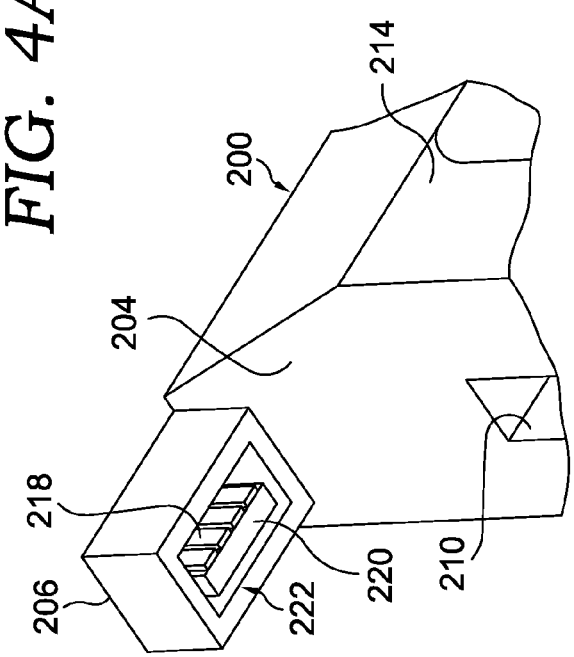

With reference to FIGS. 3A-3D, and additional reference to FIGS. 4A-4B and 5A-5B, an expandable system for mobile navigation, in the form of a mobile navigation device 1000, is illustrated. In particular, FIGS. 3A-3D show the structural housing 200 of the base units 100 and 100a for coupling with a module unit housing 300, to accomplish expansion of the capabilities of the mobile navigation device 1000. Likewise, FIGS. 4A-4B provide detailed views of a primary connector 202 (functioning as the module interface 134) configured to mate with a secondary connector 302 of the module unit housing 300, thereby electrically and communicatively coupling the base unit housing 200 and module unit housing 300 together to form the mobile navigation device 1000. The base unit housing 200 and module unit housing 300 are also referred to herein as base unit 200 and module unit 300.

The base unit housing 200, in the particular embodiment shown in FIGS. 3A-3D, has a pair of opposed side regions 204 where the module unit housing 300 attaches with the housing 200. A protruding flange 206 extends outwardly from an upper portion 208 of the base unit housing 200 at each of the side regions 204. Located within the flange 206 is the primary connector 202 (module interface) electrically coupled with the bus 110.

To guide the module unit housing 300 in proper alignment for mating of the primary connector 202 and secondary connector 302, a channel 210 of the base unit housing 200 is configured to accept therein a rail 304 of the module unit housing 300. The channel 210 is formed into each side region 204 extending upwardly from a lower region 212 of the base unit housing 200. Each channel 210 is generally parallel to a front surface 214 and a back surface 216 of the base housing unit 200. Likewise, the rail 304 is formed into one side region 306 of the module unit housing 300, extending upwardly from a lower region 308 of the housing 300. An upper region 310 of the module unit housing 300 is formed with a recess 312 where the secondary connector 302 is located. The recess 312 is sized and configured to accept therein the flange 206 of the base unit housing 200.

As shown in FIG. 3C, the base unit 200 and module unit 300 are coupled together by sliding the module unit 300 upwardly with respect to the base unit 200, so that the rail 304 is positioned within the channel 210 and the flange 206 moves into the recess 312. The user can couple a single module unit 300 with the base unit 200 (as depicted in FIG. 3A), or a pair of module units 300 (as depicted in FIG. 3D), depending on the desired functional. In the illustrative examples shown in FIGS. 3A-3D, the structural members of the base unit 200 and module unit 300 (i.e., the flange 206, channel 210, rail 304 and recess 312) are positioned such that a front face 314 of the module unit 300 is flush with the front surface 214 of the base unit 200. The base unit 200 and module unit 300 are also preferably sized and configured such that the respective top and bottom surfaces of each unit 200 and 300 are flush with one another. The module unit 300 has an arcuate back surface 316 to aid a user in gripping the unit 300 when attached to the base unit 200 to form the mobile navigation device 1000. The module unit 300 may also be configured to provide the combined mobile navigation device 1000 with a center of mass skewed towards the module unit 300, for ease of sustained gripping of the device 1000 by the module unit 300 without excessive fatigue of the user's hand. This is accomplished by placing the center of mass of the module unit 300 (when the unit 300 is upright) substantially away from the side region 306 having the rail 304, or otherwise configuring the module unit 300 to have an overall weight value that is significant when compared to the base unit 200.

Figure 6:
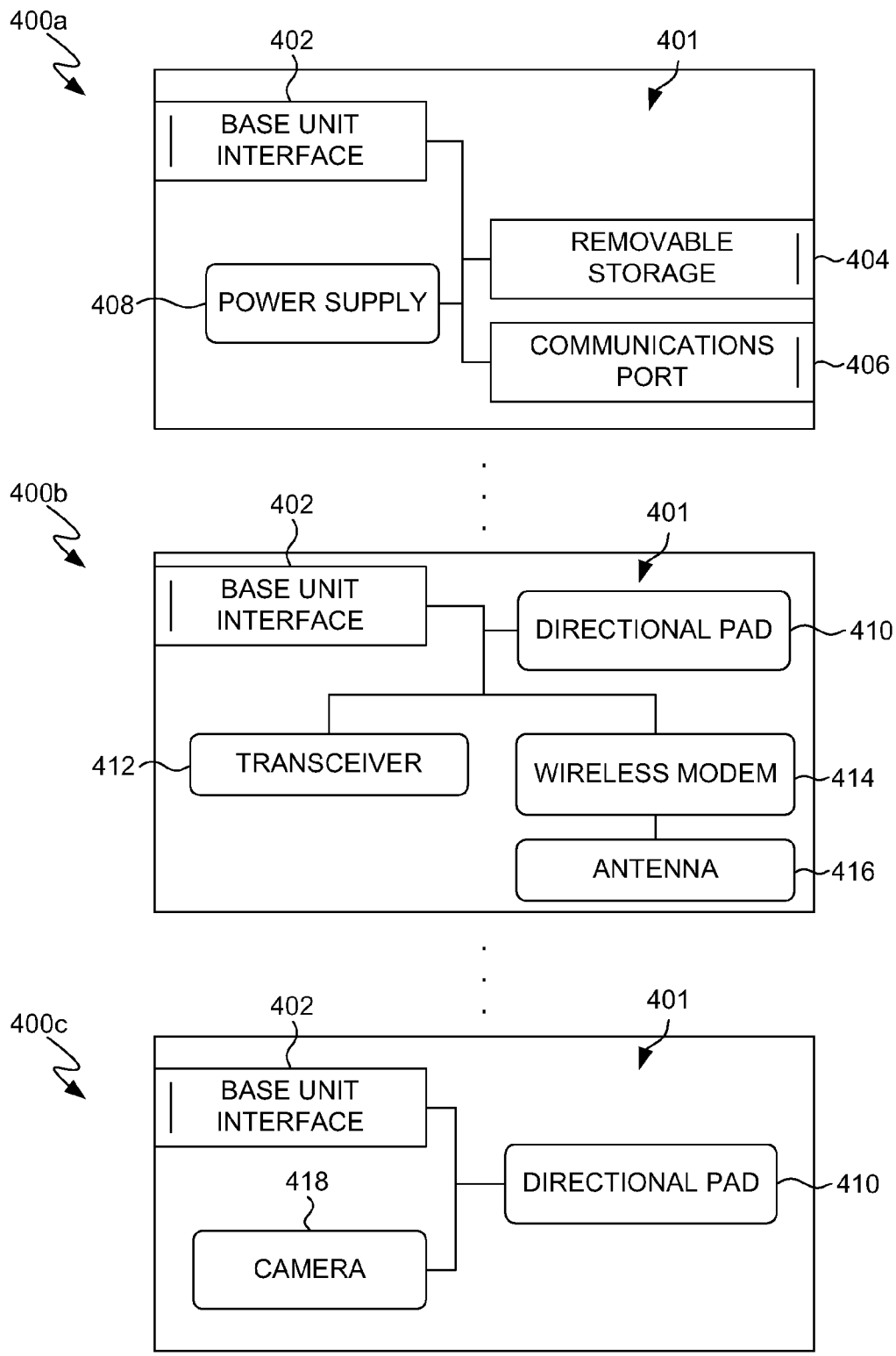
FIG. 6 is a schematic view of certain exemplary embodiments of a set of functional components of the module unit.

Further, the module unit 300 has certain functional circuitry components similar to the base units 100 and 100a, as explained in further detail herein with respect to FIG. 6. In the exemplary embodiment shown in FIGS. 3A-3D, the module unit 300 includes a directional pad 322 and a media reader slot 324 for removable storage media (e.g., a secure digital (SD) card or other flash memory device). For instance, the user can insert a flash memory card into the media reader slot 324 and utilize the direction pad 322 to make selections from menu options presented on a screen display 224 of the base unit 200 regarding downloading of data from the flash media card to the base unit 200 (e.g., for maintaining in storage 106).

It should be understood, however, that other structural arrangements and physical coupling structures between the base unit 200 and module unit 300 may be selected are a matter of design choice as alternatives to the particular arrangement shown in FIGS. 3A-3D. Such alternatives are contemplated by and within the scope of the present invention. For instance, the configuration of the flange 206 and recess 312 arrangement, as well the channel 210 and the rail 304 arrangement, may be reversed such that the coupling elements of the base unit 200 shown in FIGS. 3A-3D are located on the module unit 300, and vice versa.

Returning to FIGS. 4A and 4B, the primary connector 202 includes a set of conductive elements 218, or pins, mounted on a support 220, both of which are positioned within a cavity 222 formed in the flange 206 of the base unit 200. The primary connector 202 is sized and configured to be received within the secondary connector 302, shown in detail in FIGS. 5A and 5B. The secondary connector 302 includes a complementary set of conductive elements 318 mounted within a receptacle 320. In forming a connection between the base unit 200 and the module unit 300, the receptacle 320 receives therein the conductive elements 218 and support 220, such that the conductive elements 218 and 318 engage with one another. Each conductive element 218 and 318 represents a conductive pathway, which may be in the form of a dedicated communication channel for signals moving between the base unit 200 and the module unit 300 or merely a power circuit where electrical power moves from one unit to the other unit.

With reference to FIG. 6, various exemplary arrangements 400a, 400b and 400c for functional circuitry components 401 of the module unit 300 are illustrated. Some of the functional components previously described for the base units 100 and 100a are implemented in module unit arrangements 400a-400c as set forth below, and are renumbered accordingly for presentation within the context of the module unit arrangements 400a-400c of FIG. 6. It should also be understood that the particular functional components 401 included in certain embodiments are a matter of design choice based on the specific functional activities desired for the module unit 300 to complement the functionality existing in the base unit 200 alone. For instance, particular functional components included in certain module unit arrangements allow the base unit 200 to optionally have a more simplified functional design that does not include those same components, leading to a more compact, handheld form factor for the base unit 200.

Module unit arrangement 400a includes a base unit interface 402 (functioning as the secondary connector 302), and removable storage media 404 (such as media reader slot 324), communications port 406, and power supply 408 electrically coupled with the base unit interface 402. This particular module unit arrangement 400a allows the base unit 200 to direct activities of the module unit 300 (e.g., through touchscreen display 108, keypad 129, or directional pad 136) while providing the ability to download data from the module unit 300 to the base unit 200 through the removable storage media 404 and the communications port 406 when coupled to other devices (such as peripherals connected to the communications port by a USB cable, as one example). Further, the power supply 408 may be configured to not only provide power for the activities of the module unit 300, but to act as an auxiliary power source for the base unit 200, such that the power supply 408 provides power to the mobile navigation device 1000 as a whole.

In another embodiment, module unit arrangement 400b includes the base unit interface 402, as well as a directional pad 410, a transceiver 412, wireless modem 414 and antenna 416 connected with modem 414. The module unit 300, in this particular arrangement 400b, can provide communications activities across a telecommunications network, for instance, via the transceiver 412 in conjunctions with functional components of the base unit 200. Alternatively, the transceiver 412 supports the use of radiolocation techniques for providing a current location for the mobile navigation device 1000. Additionally, the wireless modem 414 enables connection to a network (such as the Internet) when the base unit 200 does not include such a modem, or alternatively provides either a modem 414 of different compatibility or power than a modem of the base unit 200, such as may be the case with a modem 414 enabling WI-MAX or other broadband network connectivity. The module unit arrangement 400b may optionally include power supply 408, as with the module unit arrangement 400a.

Still further, module unit arrangement 400c includes the base unit interface 402 and directional pad 410, as well as a digital camera 418. By placing camera 418 on the module unit 300 instead of on the base unit 200, the base unit realizes reduced bulk and complexity when image capturing activities are not desired.

As can be appreciated, the base unit 200 can function alone in performing navigation activities and other functions. However, by coupling selected module units 300 with the base unit 200, the mobile navigation device 1000 can provide additional functionality in certain circumstances. When less bulk is desired for increased portability, certain module units 300 may be removed and reattached later with the base unit 200 as needed. Because the module units 300 directly attach to and communicatively couple with the base unit 200, a monolithic body is formed where additional functional activities may be seamlessly integrated with the base functionality provided by the base unit 200.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A handheld modular mobile navigation device, comprising:
   a base unit housing including a bus, a processing component coupled with the bus for determining a geographic location of the navigation device, a display screen coupled with the bus for presenting information related to the determined geographic location, a power supply coupled with the bus, a receiver coupled with the bus for capturing signals utilized by the processing component in making the geographic location determination, and a pair of opposed side regions, each of the pair of opposed side regions having a primary connector coupled with the bus, a flange configured to interface with a recess of a module unit housing, and a channel extending upwardly from a lower region of the base unit housing, the channel being generally parallel to a front surface and a back surface of the base unit housing and configured to accept a rail of a module unit housing; and
   a pair of module unit housings configured for releasable attachment directly with the base unit housing, each module unit housing having a rail extending upwardly from a lower region of the module unit housing, a front face that, when attached to the base unit housing via the rail being accepted into a channel of the base unit housing, is flush with the front surface of the base unit, each module unit housing having a recess for accepting the flange of the base unit housing, and each module unit housing including a mating secondary connector for interconnecting with a primary connector of at least one of the opposed side regions of the base unit housing and a circuitry component coupled with the secondary connector for performing a dedicated function resulting in associated signals being relayed through the secondary connector to the primary connector and onto the bus of the base unit housing when the module unit housing is releasably attached directly with the base housing unit.

2. The mobile navigation device of claim 1, wherein the circuitry component of the module unit housing is at least one of a directional pad, a camera, a receiver, a wireless modem, a media slot and a connection port.

3. The mobile navigation device of claim 2, wherein the circuitry component enables a wireless Internet connection for the device.

4. The mobile navigation device of claim 1, wherein the receiver of the base unit housing comprises a GPS receiver.

5. The mobile navigation device of claim 1, wherein one of the primary connector of the base unit housing and the secondary connector of the module unit housing is a male-type electrical connector configured to be received within the other one of the primary connector and the secondary connector in the form of a female-type electrical connector.

6. A handheld expandable system for providing mobile navigation, comprising:
a base processing and display unit formed with a bus, a processing component coupled with the bus for determining a geographic location of the system, a display screen coupled with the bus for presenting information related to the determined geographic location, a power supply coupled with the bus, a receiver coupled with the bus for capturing signals utilized by the processing component in making the geographic location determination, and a pair of opposed side regions, each of the pair of opposed side regions having a protruding flange configured to interface with a recess of a module unit, within which is at least one primary connector coupled with the bus, and each of the pair of opposed side regions having a channel extending upwardly from a lower region of the base unit housing, the channel being generally parallel to a front surface and a back surface of the base housing unit and configured to accept a rail of a module unit housing; and
a pair of module units, each module unit being configured for releasable attachment with the base processing and display unit to present a monolithic body with a center of mass skewed towards the module unit, each module unit housing having a front face that, when attached to the base unit housing, is flush with the front surface of the base unit, and each module unit being formed with:
a rail extending upwardly from a lower region of the module unit,
a recess for accepting a flange of the base unit housing,
a secondary connector mateable with one of the at least one primary connector to electrically couple the respective module unit to the base processing and display unit, and
a circuitry component coupled with the secondary connector, wherein the circuitry component performs a dedicated function resulting in associated signals being relayed through the secondary connector to one of the at least one primary connector and onto the bus when the secondary connector mates with the respective primary connector.

7. The expandable system of claim 6, wherein the circuitry component of the at least one module unit is at least one of a directional pad, a camera, a receiver, a wireless modem, a media slot and a connection port.

8. The expandable system of claim 7, wherein the circuitry component enables a wireless Internet connection for the system.

9. The expandable system of claim 6, wherein the receiver of the base processing and display unit comprises a GPS receiver.

10. The expandable system of claim 6, wherein one of at least one primary connector of the base processing and display unit and the secondary connector of the at least one module unit is a male-type electrical connector configured to be received within the other one of the respective primary connector and the respective secondary connector in the form of a female-type electrical connector.

11. A method of expanding the functionality of a mobile navigation system, comprising:
providing a base processing and display unit formed with a bus, a processing component coupled with the bus for determining a geographic location of the navigation device, a display screen coupled with the bus for displaying information related to the determined geographic location, a power supply coupled with the bus, a receiver coupled with the bus for capturing signals utilized by the processing component in making the geographic location determination, and a pair of opposed side regions, each of the pair of opposed side regions having a primary connector coupled with the bus, a flange configured to interface with a recess of a module unit housing, and a channel extending upwardly from a lower region of the base unit housing, the channel being generally parallel to a front surface and a back surface of the base housing unit and configured to accept a rail of a module unit;
releasably attaching a module unit formed with a front face, a rail extending upwardly from a lower region of the module unit, a recess for accepting the flange of the base unit housing, a secondary connector and a circuitry component directly to the base processing and display unit, such that the front face of the module unit is flush with the front surface of the base unit, the secondary connector mates with and electrically connects to the primary connector and the combined base processing and display unit and attached module unit form a monolithic body, wherein the circuitry component is coupled with the secondary connector; and
engaging, by the base processing and display unit, the circuitry component to perform a dedicated function resulting in associated signals being relayed through the secondary connector to the primary connector and onto the bus of the base processing and display unit, wherein the dedicated function is at least sometimes a function other than determining a geographic location of the navigation device.

* * * * *